US008606287B2

(12) United States Patent
Landau et al.

(10) Patent No.: US 8,606,287 B2
(45) Date of Patent: Dec. 10, 2013

(54) METHOD AND SYSTEM FOR CONTROLLING AND REGULATING SERVICES AND RESOURCES IN HIGH-PERFORMANCE DOWNLINK CHANNELS

(75) Inventors: Uri Landau, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1032 days.

(21) Appl. No.: 11/839,363

(22) Filed: Aug. 15, 2007

(65) Prior Publication Data

US 2008/0165836 A1   Jul. 10, 2008

Related U.S. Application Data

(60) Provisional application No. 60/884,178, filed on Jan. 9, 2007.

(51) Int. Cl.
   *H04W 72/00*   (2009.01)
(52) U.S. Cl.
   USPC ........ 455/452.1; 455/450; 455/451; 370/329; 370/330
(58) Field of Classification Search
   USPC ............ 455/101, 132, 296, 69, 500; 375/347, 375/299, 267, 340, 150, 148, 221; 370/208, 370/342, 343, 345
   See application file for complete search history.

(56) References Cited

U.S. PATENT DOCUMENTS

| 6,449,255 | B1 * | 9/2002 | Waclawsky | 370/236 |
|---|---|---|---|---|
| 7,676,007 | B1 * | 3/2010 | Choi et al. | 375/347 |
| 7,839,865 | B2 * | 11/2010 | Doherty et al. | 370/397 |
| 7,996,545 | B2 * | 8/2011 | Vogl et al. | 709/229 |
| 8,306,668 | B2 * | 11/2012 | Tamarkin et al. | 700/286 |
| 8,364,159 | B2 * | 1/2013 | Turner | 455/451 |
| 2005/0120097 | A1 * | 6/2005 | Walton et al. | 709/220 |
| 2006/0073816 | A1 * | 4/2006 | Kim et al. | 455/414.1 |
| 2007/0042720 | A1 * | 2/2007 | Pan et al. | 455/69 |
| 2009/0290563 | A1 * | 11/2009 | Gu et al. | 370/338 |
| 2010/0177740 | A1 * | 7/2010 | Lim et al. | 370/335 |

* cited by examiner

*Primary Examiner* — Jean Gelin
(74) *Attorney, Agent, or Firm* — Sterne, Kessler, Goldstein & Fox P.L.L.C.

(57) ABSTRACT

Aspects of a method and system for controlling and regulating services and resources in high-performance downlink channels may include receiving, at a second communication device, from a first communication device, one or more process data packets. For one or more feedback classes, at least one feedback message may be generated from the one or more process data packets associated with a process that may be associated with the one or more feedback classes. One or more feedback messages may be generated from the at least one generated feedback message and transmitted from the second communication device to the first communication device.

22 Claims, 4 Drawing Sheets

METHOD AND SYSTEM FOR CONTROLLING AND REGULATING SERVICES AND RESOURCES IN HIGH-PERFORMANCE DOWNLINK CHANNELS

CROSS-REFERENCE TO RELATED APPLICATIONS/INCORPORATION BY REFERENCE

This application makes reference to, claims priority to, and claims the benefit of U.S. Provisional Application Ser. No. 60/884,178, filed on Jan. 9, 2007.

The above referenced application is hereby incorporated herein by reference in its entirety.

FIELD OF THE INVENTION

Certain embodiments of the invention relate to signal processing for communication systems. More specifically, certain embodiments of the invention relate to a method and system for controlling and regulating services and resources in high-performance downlink channels.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some work on multiple antenna systems may be focused on systems that support single user point-to-point links, other work may focus on multiuser scenarios. Communication systems that employ multiple antennas may greatly improve the system capacity.

For example, the European Telecommunication Standards Institute (ETSI) and the Third Generation Partnership Project (3GPP) were the driving forces in establishing and evolving the Universal Mobile Telecommunications System (UMTS), a third generation evolutionary cellular mobile system that has grown out of the enormously successful GSM (Global System for Mobile Communications) standard. Basic UMTS with theoretical data rates of up to 2 Mbps has evolved over the last few years to comprise High Speed Downlink Packet Access (HSDPA) and High Speed Uplink Packet Access (HSUPA). These standard extensions use advanced signal processing techniques and network management to enhance available data throughputs. Theoretical downlink rates of up to 14.4 Mbps and uplink rates of 5.8 Mbps may be achieved and are a further step towards truly mobile broadband services.

Following the standardization of HSDPA and HSUPA, 3GPP members launched a new initiative named Long Term Evolution (LTE), concerned primarily with the evolution of the Universal Terrestrial Radio Access (UTRA) Network to support future services with even higher data rates, lower latency and more flexibility in spectrum usage and use scenarios for packet-based mobile telecommunication systems. Regarding the physical layer, bandwidths from as little as 1.25 MHz up to 20 MHz were agreed upon to provide the required spectral flexibility and in December 2005, it was decided that the downlink would be using Orthogonal Frequency Division Multiplexing (OFDM), whereas the uplink will use Single-Carrier—Frequency Division Multiple Access (SC-FDMA). Furthermore, it was agreed that MIMO operations will be incorporated as an optional, yet fundamental design feature, with up to four antennas that may be provided at both the user equipment (UE—mobile device) and the Node B (a base station in UMTS). The most effective use of MIMO technologies requires consideration of MIMO-specific design features from the outset and incorporation of various features that permit MIMO usage to leverage its potential beyond a mere add-on feature. Target peak data rates of this Evolved Universal Terrestrial Radio Access (E-UTRA) system are as high as 100 Mbps in the downlink with a 20 MHz bandwidth and up to 50 Mbps in a 20 MHz uplink bandwidth. Such rates necessitate the use of advanced multi-antenna technology and signal processing at the physical layer.

To obtain significant performance gains using MIMO technology, it may however be desirable to supply information on the channel to the transmitter to allow enhanced performance. Various MIMO technologies may benefit or require knowledge about the transmission channel, referred to as channel state information (CSI). With increasing numbers of transmit and receive antennas in the MIMO system, feeding back channel state information may involve transferring large amounts of data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for controlling and regulating services and resources in high-performance downlink channels, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for controlling and regulating services and resources in high-performance downlink channels. Aspects of the method and system for controlling and regulating services and resources in high-performance downlink channels may comprise receiving, at a second communication device, from a first communication device, one or more process data packets. For one or more feedback classes, at least one feedback message may be generated from the one or more process data packets associated with a process that may be associated with the one or more feedback classes. One or more feedback messages may be generated from the at least one generated feedback message and transmitted from the second communication device to the first communication device.

The first and/or the second communication device may comprise MIMO transmitters and/or receivers. In an exemplary embodiment of the invention, the set of feedback classes may comprise 3 feedback classes. The one or more feedback messages may be transmitted at arbitrary time instances and consecutive realizations of the one or more feedback messages may be separated by arbitrary time intervals. The arbitrary time interval may be adjusted as a function of at least a type of communication link between the first and second communication device. The transmission of some of the one or more feedback messages associated with ore or more of the feedback classes may be temporarily suspended when at least two feedback classes transmit consecutive realizations of the feedback messages at similar time instances, or when some of the feedback messages associated with at least two feedback classes comprise data that may be derived from remaining non-suspended feedback messages. The feedback messages may be assigned (quantized) channel state information.

Figure 1A:
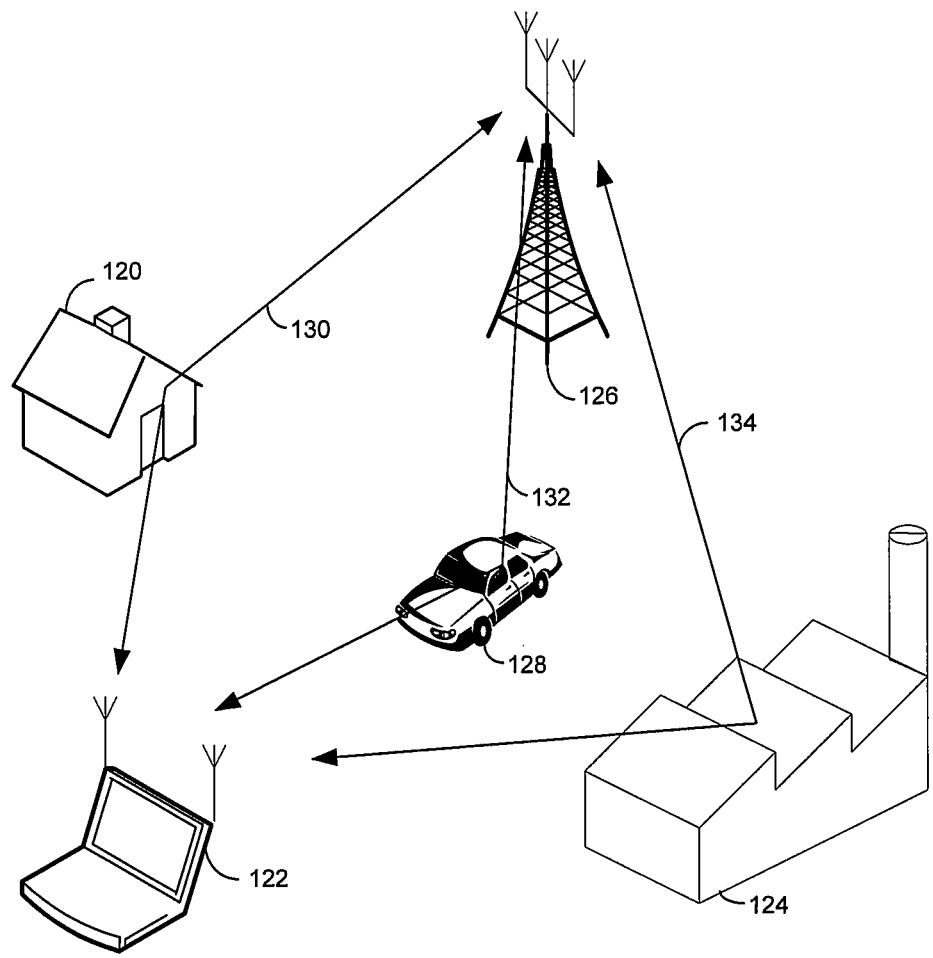
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals. Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/ or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
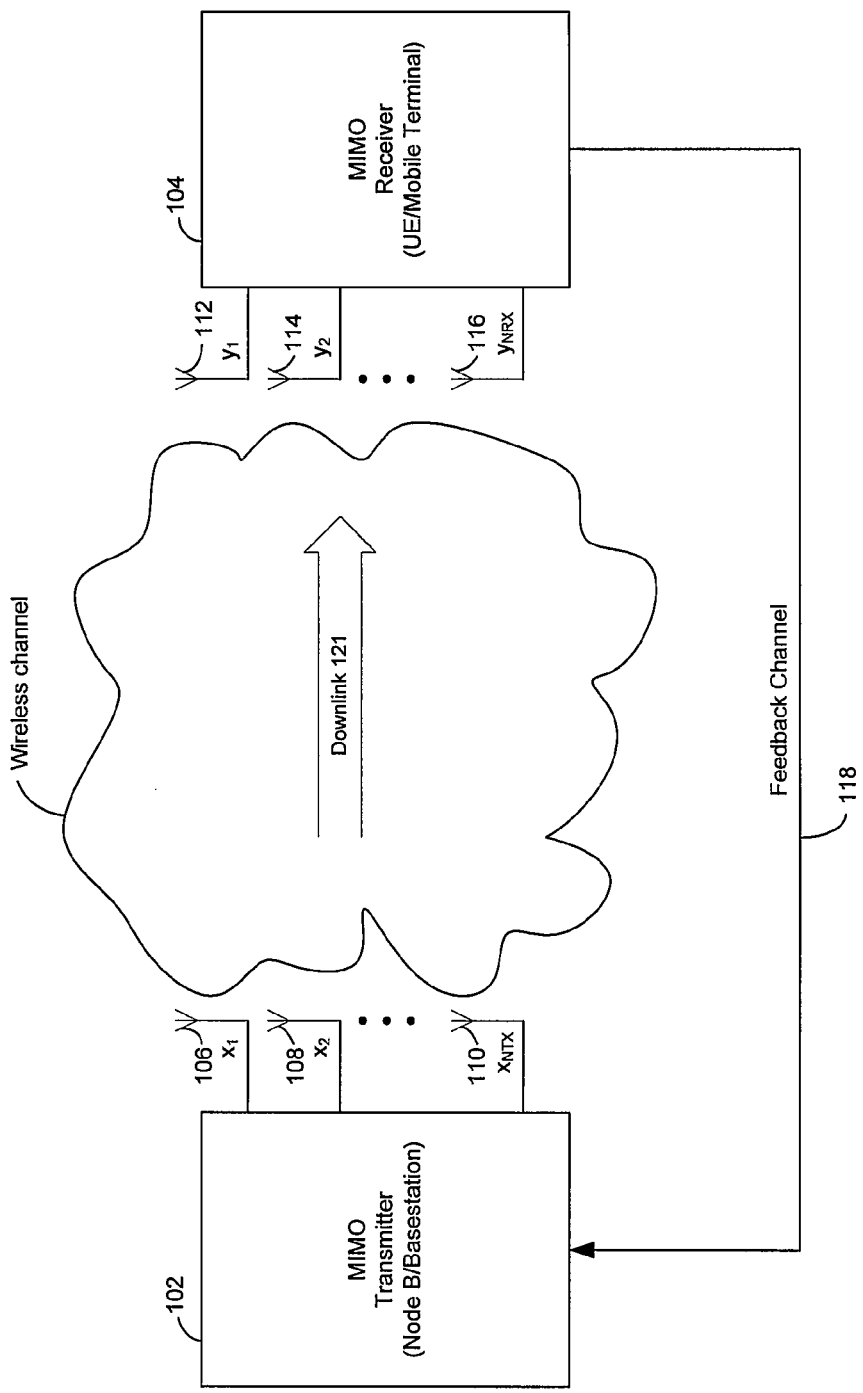
FIG. 1B is a diagram illustrating an exemplary MIMO downlink communication system with feedback, in accordance with an embodiment of the invention.

FIG. 1B is a diagram illustrating an exemplary MIMO downlink communication system with feedback, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising a downlink channel 121, and a feedback channel 118. There may be $N_{TX}$ transmitter antennas and $N_{RX}$ receiver antennas. There is also shown transmit symbols $x_1$, $x_2$, and $x_{NTX}$, and receive symbols $y_1$, $y_2$, and $y_{NRX}$.

The MIMO transmitter 102 may comprise suitable logic, circuitry and/or code that may be enabled to generate transmit symbols $x_i$ $i \in \{1, 2, \ldots, N_{TX}\}$ that may be transmitted by the transmit antennas, of which the antennas 106, 108 and 110 may be depicted in FIG. 1B. The MIMO transmitter 102 may be, for example, a Node B in UMTS or a base station in a general wireless system. The MIMO receiver 104 may comprise suitable logic, circuitry and/or code that may be enabled to process the receive symbols $y_i$ $i \in \{1, 2, \ldots, N_{RX}\}$. The MIMO receiver may be a User Equipment (UE) in UMTS or a mobile terminal in a general wireless system.

At the MIMO transmitter 102, a data symbol may be transmitted simultaneously over all antennas or a symbol may be transmitted on one antenna only, that is, the transmit symbols $x_i$ may be a function of an arbitrary number of data symbols. The receive symbols $y_i$ may receive a superposition of the transmitted signals from up to $N_{TX}$ antennas 106 through 110, after the transmitted signals have traversed the downlink channel 121 on the wireless channel. The feedback channel 118 may be a logical channel that may be within an uplink physical channel. The uplink physical channel may carry data and/or control information from the MIMO receiver 104 to the MIMO transmitter 102 and may be characterized by carrying data in the direction opposite to the downlink channel 121. Unless noted otherwise, uplink and feedback channel 118 may be used synonymously here. In a MIMO wireless channel, such as downlink channel 121, it may be possible to achieve several parallel spatial streams. Spatial streams may be data streams that may be non-interfering (weakly interfering in practice) from the MIMO transmitter 102 to the MIMO receiver 104, through the use of appropriate signal processing at the MIMO transmitter 102 and/or the MIMO receiver 104. Spatial streams may be a particularly attractive feature of MIMO channels since spatial streams may behave similarly to parallel, non-interfering single antenna communications systems. Since such a MIMO system may use the same bandwidth and transmission power like a single antennas communication system, the available bandwidth resources may be exploited more optimally, leading to high spectral efficiency. The number of spatial streams may be less than or equal to the number of receive or transmit antennas, whichever may be smaller.

In the mobile network proposed by the LTE project, advanced techniques such MIMO transmit/receive antennas, that may provide a multifold increase in the data rate coupled with reduced latency in Node-B time response, may create a wide scope of services that the network may provide. Services may vary from video to be watched to downloading of data files and/or sending text messages, for example. The services may be characterized by, for example: the mean information-rate (bit/sec), the reliability (mean error-rate) that may be required and/or the mean of the delay a user may experience. Some applications may require more sophisticated characterizations, for example, peak-to-peak change, variance and/or bandwidth of any one of the parameters. Other considerations may comprise the capability of the UE. For example, buffer-size allocation, bandwidth and/or features such as receiving multiple spatial streams or coded streams.

In some instances, it may be understood that the network may be offering improved efficiency and effectiveness if the network may be capable to better match offered services to the user's need. However, tailoring these services may require resource allocations. Consequently, a mechanism may be proposed for such a goal, that may be characterized not only by the gain it may provide (in term of reduced transmitted power or data-rate, for example) but also by the added load it may impose. In some embodiments of the invention, examples for such mechanisms in WCDMA networks may comprise the reporting, to Node-B, of one or more parameters. that may be associated with the mobile SNR—that may be referred to as CQI (Channel Quality Indicator). Or, parameters that may be associated with the communication channel (for example, frequency selective channel information; WCDMA Standard; Closed-loop mode 1 or Closed-loop mode 2). In some instances, the added cost may be due to hardware, in the mobile phone and/or the Node-B as well as the need to stream up this information, in timely fashion, from one or more users.

Reporting the mobile status to Node B may be extended in the HSDPA standard. Data, in this standard, may be transmitted in packets. The mobile may acknowledge the Node-B whether a packet may have been successfully decoded (ACK). If not (NACK may be sent), a retransmit of the same packet may be pursued. Only part of the packet may be retransmitted; the mobile, which may, in some instances, be capable of combining multiple retransmits, may attempt to decode the combined packet, which may become more reliable with each retransmit. This mechanism may be referred to as HARQ (Hybrid Automatic Request) and may require the usage of down-link control shared channels (as well as, in some instances, up-link channels). A Mobile-A may continuously identify, for example, by decoding the control channel, whether an incoming packet may comprise a tag-A and in this case may identify the modulation scheme (QPSK or QAM16), the bits may be transmitted (for example, rate-matching scheme) and the packet (it may store, in some instances, more than one un-decoded packet).

The standard in the future may evolve to support, as mentioned in the Background section, more complex transmit and/or receive protocols: transmit/receive through multiple antennas, multiple spatial streams, multiple coded streams, for example. Further parameterization of the service may be carried out through the PRB allocations (Physical Resource Block: In one embodiment of the invention, there may be 12 adjacent OFDM carriers). A PRB may be associated with a communication channel that may be characterized by a channel response between one or more transmit antenna and one or more receive antennas. For example, a 4×4 (4-receive, 4-transmit antennas) or a 1×1 antenna array. In some instances, a PRB may be characterized by a channel SNR and/or PRBS identifiers.

To utilize the cooperation of the Node-B transmitter in a protocol similar to the HARQ as it may be used in the HSDPA standard, the CQI of the entire bandwidth (quantized into, for example, 50 PRBS) may be made available at the transmitter. In these instances, sharing of resources (PRBs) may be prioritized for a user, for example based on added capacity and/or throughput to the network.

The information above may represent significant amounts of data, whose rate of change may depend on a number of factors, for example, on the mobility of the user. In an exemplary embodiment of the invention, at high mobility with a fully loaded cell (or network) with, for example, 50 PRBs (for example, using 10 MHz standard bandwidth), one spatial stream and, in the instance where a mobile may report the CQI of the entire bandwidth by a numerology of 7 bits/PRB, the load on the uplink may be (just by reporting the CQI) given by the following exemplary relationship:

CQI-Load=7×50×#users×reporting-rate;

where the symbol #users is number of users in the cell. In some cases, a mean uplink modulation of QAM16 (4 bits) may be present and the following relationship may be derived:

Total-Cell-Uplink=4×7×12×50×packet-rate;

in instances where similar configurations both on the up- and down link may be used, which may be based on 7 symbols/carrier/packet. Thus, at the high reporting rate, the load of just reporting the exemplary full CQI may be as high as #users×(25/12)%. With #users=12, for example, full CQI reporting may occupy 25% of the full uplink capacity.

Clearly, the substantial increase in the feedback information that may occur, as well as the variety of ways and scenarios it which it may be used, may require an effort in two or more main directions: One of them may be how to compress the feedback information.

In accordance with various embodiments of the invention, the need of organization, scheduling and/or classification of the feedback information may be addressed.

Cooperation of the cell transmitter may have an effect on the service in several ways. For example, maintaining a UE data rate with overall users efficient resource allocation, for example BW and power. Furthermore, utilization of antenna array configuration (MIMO) in regulating resources allocations; Timely response to a UE request of a high, short datarate; Timely response to a UE geometry may change including, hand-over (seamless switching to neighbor cell may be achieved while maintaining communication); Interference cancelling and geometry based resource allocation in the cell.

In one embodiment of the invention, feedback class 1 may carry information related to modulation, coding rate per code and/or spatial stream, positive packet acknowledgements (ACK), and negative packet acknowledgements (NACK). A feedback class 2 may comprise beamforming information. Beamforming information may comprise, but is not limited to, MIMO pre-coding matrices, indices to pre-coding matrices that may be selected from a pre-coding matrices codebook, rank of the channel matrix, number of spatial streams, selected antennas, for example for switched spatial diversity protocols etc. A feedback class 3 may comprise Channel Quality Indicators (CQIs), that may represent, for example, a Signal-to-Noise ratio (SNR) profile over the available downlink bandwidth. Feedback information may be quantized in order to further reduce the required feedback data.

Figure 2:
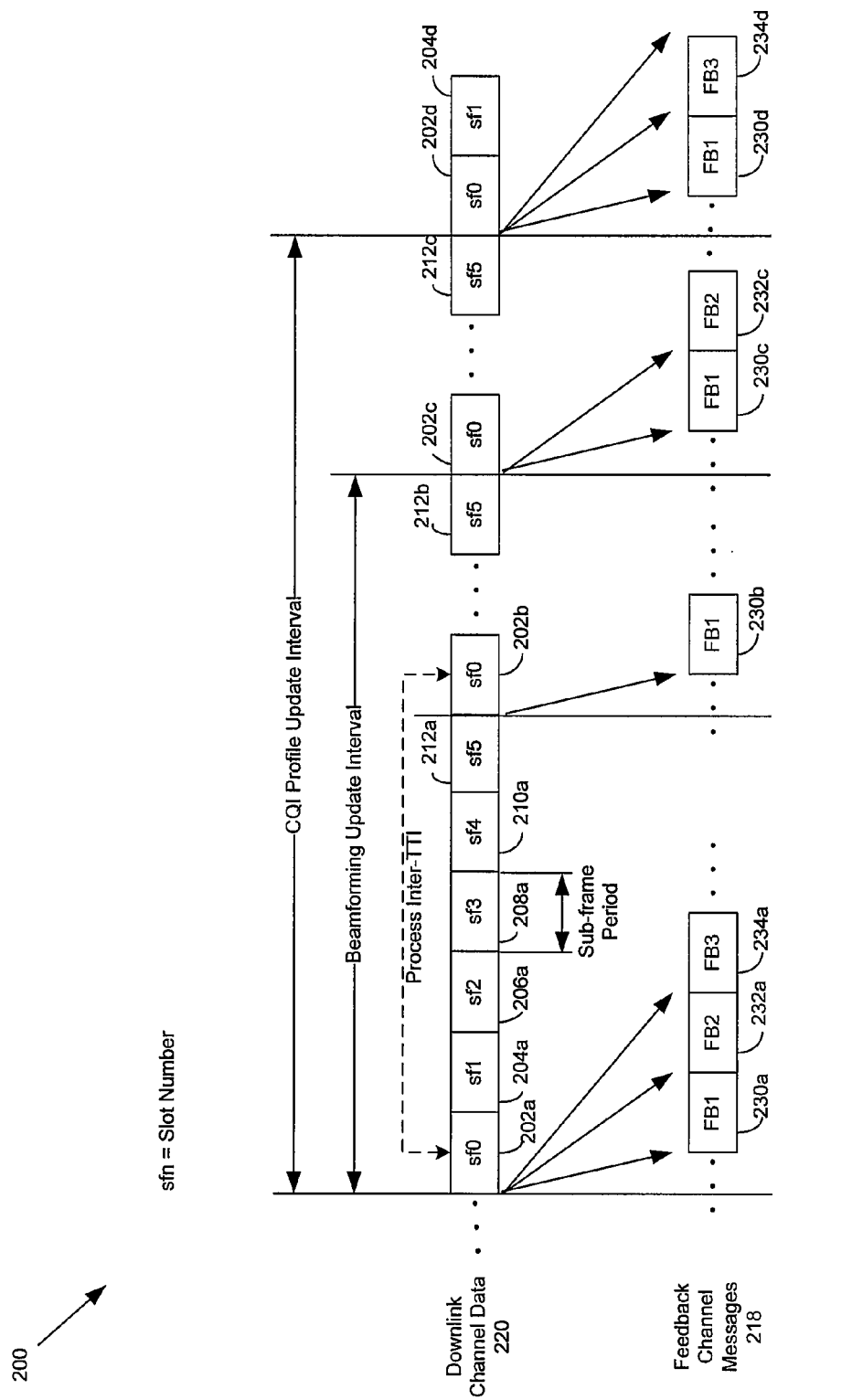
FIG. 2 shows an exemplary time sequence of events a UE may go through, in accordance with an embodiment of the invention

FIG. 2 shows an exemplary time sequence of events a UE may go through, in accordance with an embodiment of the invention. Referring to FIG. 2, there is shown a feedback data system 200, comprising downlink channel data 220 and feedback channel data 218. The downlink channel data 220 may comprise of subframes or a slots, for which the mobile may receive data packet sf0 202a, sf1 204a, sf2 206a, sf3 208a, sf4 210a and sf5 212a The feedback channel 218 may comprise feedback messages, of which feedback messages FB1 230a, FB2 232a, and FB3 234a may be depicted. There is also shown an arrow indicating increasing time, a CQI profile update interval, a process inter-TTI, and subframe period A process inter-TTI may be associated with an update rate of the feedback class 1 (shown in FIG. 2 as Process Inter TTI). A beamforming update interval may be associated with an update rate of the feedback class 2 (shown in FIG. 2 as Beamforming Update Interval). A CQI profile update interval may be associated with update rate of the feedback class 3 (shown in FIG. 2 as CQI Profile Interval). As described above, the received data-packet for example, during sf0, may depict a process where by a packet of data or part of it, for example, 202a, may be received. In the exemplary embodiment shown, sf0-sf5 may depict 6 processes. If, for example, the mobile fails to decode data sent from packet 202a, the same process sf0 may receive another packet sf0 202b after a process inter-TTI interval. 202a and 202b may be part of or a repeat of the same coded data-packet. As described above, the combined transmitted packets of a process may constitute one coded packet. The combined received packets (for example 202a and 202b) may have increased probability to be decoded correctly. Similarly, for processes sf1 through sf5. As described, the mobile may inform the base-station, by transmitting an ACK (for success) or NACK (for failure), as to what may be transmitted at the next sub-frame. Therefore, each process may transmit a feedback message over the feedback channel 218. FIG. 2 may illustrate the mobile receiving a data packet during sf0 only. However, it may receive data through processes, for example, sf1-sf5 that may depend on the required service. In another embodiment of the invention, the period process inter-TTI may be divided into a different number of processes.

Feedback class 1 may be associated with the highest feedback rate. In the exemplary embodiment depicted, feedback class 1 may generate a feedback message FB1 for process 0, for example, that may be associated with sf0. Some of the processes sf1-sf5 may be associated with class 1 feedback that may comprise feedback massages for the processes. In one embodiment of the invention, the feedback class 1 may, for example, comprise the modulation order and modulation type for the next data packet of a process. These feedback quantities may be related to or derived from the CSI and may help to sustain the data rates requested by the mobile terminal. With regard to FIG. 2, for example, it may be shown that up to 6 processes may be received by one or more mobile terminal. In another embodiment of the invention, other resource allocations may be possible and hence the number of processes may vary. In the case of UMTS LTE, the feedback class 1 may comprise MCS (Modulation-Coding Set) information, and each MCS may be associated with one process.

The feedback class 2 may, for example, comprise information related to beamforming. The update rate of feedback class 2 may be defined through the beamforming update interval. In some cases, this information may be updated at a lower rate than feedback class 1. Furthermore, in some instances, the feedback class 2 information may be related to or used by several processes. Feedback class 2 information may comprise, but is not limited to, information such as a pre-coding matrix, the number of spatial streams (sometimes referred to as rank), multi-user interference cancellation information, spatial or temporal antenna switch diversity information, mobile terminal position estimates and others. In some cases, the feedback information for any class may be quantized to reduce the required data rate. For example, it may be possible to feed back an index to a codebook of pre-coding matrices rather than the pre-coding matrix itself. In other cases, it may be possible to use differential and/or incremental protocols to reduce the required feedback data rate.

Figure 3:
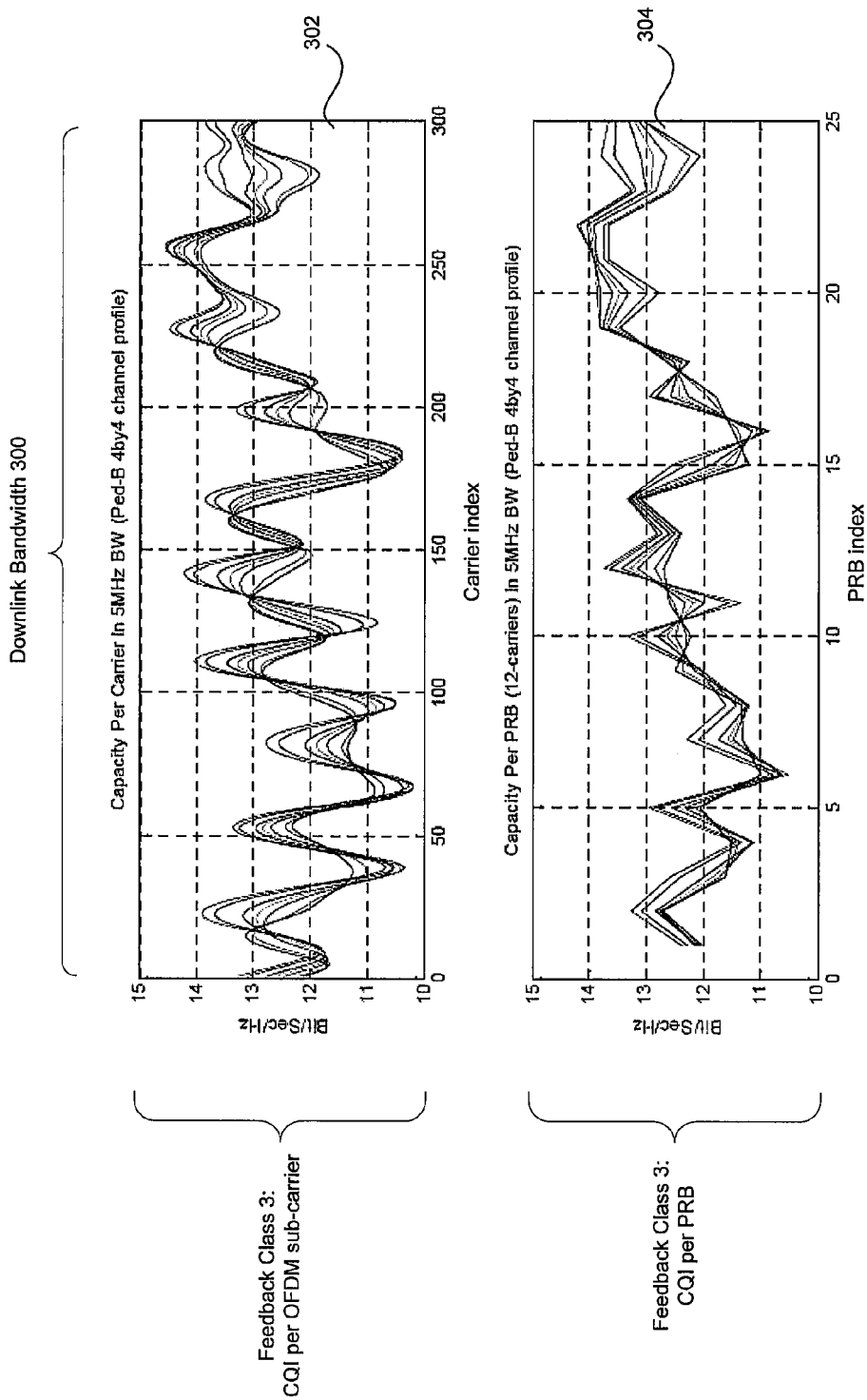
FIG. 3 illustrates an exemplary CQI channel profile for different downlink frequency resolutions, in accordance with an embodiment of the invention.

FIG. 3 illustrates an exemplary CQI channel profile for different downlink frequency resolutions, in accordance with an embodiment of the invention. Referring to FIG. 3, there is shown a downlink bandwidth 300, a CQI downlink profile per carrier 302, and a CQI downlink profile per PRB (Physical Resource Block) 304.

In one embodiment of the invention, feedback class 3 may feed back channel quality indicators (CQIs) that may be a function of the wireless channel quality. For example, the entire downlink bandwidth 300 available on the downlink channel 121 may be divided into M frequency blocks. For each of the M blocks, a CQI may be fed back to the MIMO transmitter 102 indicating the channel quality of the frequency block. In the case of OFDM, a frequency block may be defined by a number of contiguous sub-carriers. For example, in UMTS LTE, a physical resource block (PRB) may in some cases be defined as a block of 12 sub-carriers. By feeding back a CQI for every $N_P$ PRB, a channel quality profile over the entire downlink bandwidth 300 of the channel between the MIMO transmitter 102 and the MIMO receiver 104 may be obtained. Furthermore, by varying $N_P$, the frequency resolution of the channel profile may be traded-off for lower feedback rate since less CQIs may need to be fed back.

An exemplary OFDM system as depicted in FIG. 3 may divide a 5 MHz downlink bandwidth 300 into 300 carriers, as shown in the CQI downlink profile per carrier 302. In some instances, it may be advantageous to feed back a CQI for every sub-carrier. By feeding back a CQI for each of the 300 sub-carriers shown in the exemplary OFDM system in FIG. 3 from the MIMO receiver 104 to the MIMO transmitter 102, a CQI downlink profile per carrier 302 may be constructed at the base station (or Node B, as a base station may be referred to in UMTS). Alternatively, a CQI may be fed back per PRB, where a PRB may be a group of 12 contiguous sub-carriers, as described above. This may produce a CQI downlink profile per PRB 304. As shown, the frequency resolution in CQI downlink profile per carrier 302 may be 12 times higher than the frequency resolution of the CQU downlink profile per PRB 304, at the cost of an increased feedback rate. Depending on the quality of service (QOS) requirements by the mobile terminal/UE, a suitable trade-off between the resolution of the CQI downlink profile and the feedback rate may be obtained.

An exemplary usage of a CQI channel profile at the base station may be the resource allocation in time and frequency between multiple mobile terminals, for example, to optimize the throughput of a mobile, a cell or a network.

In accordance with an embodiment of the invention, a method and system for controlling and regulating services and resources in high-performance downlink channels may comprise receiving, at a second communication device, for example MIMO receiver 104, from a first communication device, for example MIMO transmitter 102, one or more process data packets. For one or more feedback classes, for example FB1, at least one feedback message may be generated from the one or more process data packets associated with a process that may be associated with the one or more feedback classes, as shown in FIG. 2. One or more feedback messages may be generated from the at least one generated feedback message and transmitted from the second communication device to the first communication device.

The first and/or the second communication device may comprise MIMO transmitters and/or receivers. In an exemplary embodiment of the invention, the set of feedback classes may comprise 3 feedback classes, as illustrated in FIG. 2. The one or more feedback messages may be transmitted at arbitrary time instances and consecutive realizations of the one or more feedback messages may be separated by arbitrary time intervals. The arbitrary time interval may be adjusted as a function of at least a type of communication link between the first and second communication device. The transmission of some of the one or more feedback messages associated with ore or more of the feedback classes may be temporarily suspended when at least two feedback classes transmit consecutive realizations of the feedback messages at similar time instances, or when some of the feedback messages associated with at least two feedback classes comprise data that may be derived from remaining non-suspended feedback messages. The feedback messages may be assigned (quantized) channel state information.

Another embodiment of the invention may provide a machine-readable storage, having stored thereon, a computer program having at least one code section executable by a machine, thereby causing the machine to perform the steps as described above for controlling and regulating services and resources in high-performance downlink channels.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
  receiving a process data packet from a first communication device at a second communication device;
  generating a first feedback message from the process data packet for a first feedback class associated with a process;

transmitting the first feedback message from the second communication device to the first communication device; and temporarily suspending the transmission of the first feedback message based on a second feedback message.

2. The method according to claim 1, wherein at least one of the first communication device and the second communication device comprises a MIMO transmitter or receiver.

3. The method according to claim 1, wherein the first feedback class comprises one of three feedback classes.

4. The method according to claim 1, wherein the first feedback message is transmitted at an arbitrary time instance.

5. The method according to claim 1, further comprising transmitting consecutive realizations of the first feedback message separated by an arbitrary time interval.

6. The method according to claim 5, further comprising adjusting the arbitrary time interval as a function of a type of communication link between the first communication device and the second communication device.

7. The method according to claim 1, wherein the transmission of the first feedback message is temporarily suspended after determining that the second feedback message is being transmitted at a similar time instance as the first feedback message.

8. The method according to claim 1, wherein the transmission of the first feedback message is temporarily suspended when the first feedback message comprises data that is derivable from the second feedback message.

9. The method according to claim 1, further comprising assigning channel state information to the first feedback message.

10. The method according to claim 1, further comprising assigning quantized channel state information to the first feedback message.

11. The method according to claim 1, wherein the first feedback message is utilized at the first communication device to construct a variable resolution channel quality indicator frequency profile and wherein a variable resolution may be adjusted by varying a feedback rate of the first feedback message, and by varying a frequency granularity of channel quality indicators associated with the first feedback message.

12. A system for processing communication signals, the system comprising:

a first communication device comprising one or more circuits, the one or more circuits are configured to enable:

reception of a process data packet at the first communication device;

generation of a first feedback message from the process data packet for a first feedback class associated with a process;

transmission of the first feedback message from the first communication device to another communication device; and temporary suspension of the transmission of the first feedback message based on a second feedback message.

13. The system according to claim 12, wherein the first communication device comprises a MIMO transmitter or receiver.

14. The system according to claim 12, wherein the first feedback class comprises one of three feedback classes.

15. The system according to claim 12, wherein the one or more circuits are configured to transmit the first feedback message at an arbitrary time instance.

16. The system according to claim 12, wherein the one or more circuits are configured to transmit consecutive realizations of the first feedback message separated by an arbitrary time interval.

17. The system according to claim 16, wherein the one or more circuits are configured to adjust the arbitrary time interval as a function of a type of communication link between the first communication device and the second communication device.

18. The system according to claim 12, wherein the one or more circuits are configured to temporarily suspend transmission of the first feedback message after determining that the second feedback message is being transmitted at a similar time instance as the first feedback message.

19. The system according to claim 12, wherein the one or more circuits are configured to temporarily suspend transmission of the first feedback message, when the first feedback message comprises data that is derivable from the second feedback message.

20. The system according to claim 12, wherein the one or more circuits are configured to assign channel state information to the first feedback message.

21. The system according to claim 12, wherein the one or more circuits are configured to assign quantized channel state information to the first feedback message.

22. The system according to claim 12, wherein the first feedback message is utilized at the first communication device to construct a variable resolution channel quality indicator frequency profile and wherein a variable resolution may be adjusted by varying a feedback rate of the first feedback message, and by varying a frequency granularity of channel quality indicators associated with the first feedback message.

* * * * *